United States Patent [19]

Kennedy et al.

[11] Patent Number: 4,743,281

[45] Date of Patent: May 10, 1988

[54] FILTER PANEL ASSEMBLY

[75] Inventors: Robert W. Kennedy, Bridgewater; Howard J. Tyler, Marlboro, both of N.J.

[73] Assignee: White Consolidated Industries, Inc., Cleveland, Ohio

[21] Appl. No.: 30,665

[22] Filed: Mar. 27, 1987

[51] Int. Cl.$^4$ .............................................. B01D 46/00
[52] U.S. Cl. ........................................ 55/493; 55/504; 55/508; 55/501; 55/DIG. 31
[58] Field of Search ................ 55/490, 492, 491, 493, 55/494, 495, 501, 503, 504, 508, 509, 511, DIG. 31; 62/262

[56] References Cited

U.S. PATENT DOCUMENTS

| 2,575,499 | 11/1951 | Manow ................................. 55/481 |
| 3,252,580 | 5/1966 | Getzin ................................. 55/503 |
| 4,607,500 | 8/1986 | Bolton et al. ........................ 62/344 |

FOREIGN PATENT DOCUMENTS 183288 10/1984 Japan ................................. 55/495

Primary Examiner—Bernard Nozick
Attorney, Agent, or Firm—Alfred E. Miller

[57] ABSTRACT

A front panel mounting arrangement for a sheet filter in an air moving appliance including a frame, and when the sheet filter is in a mounted condition can be incorporated in the front panel from alternate directions, being the top and bottom of the panel, while the panel is capable of limited movement away from the frame and also capable of relative inclination with respect to the frame.

18 Claims, 8 Drawing Sheets

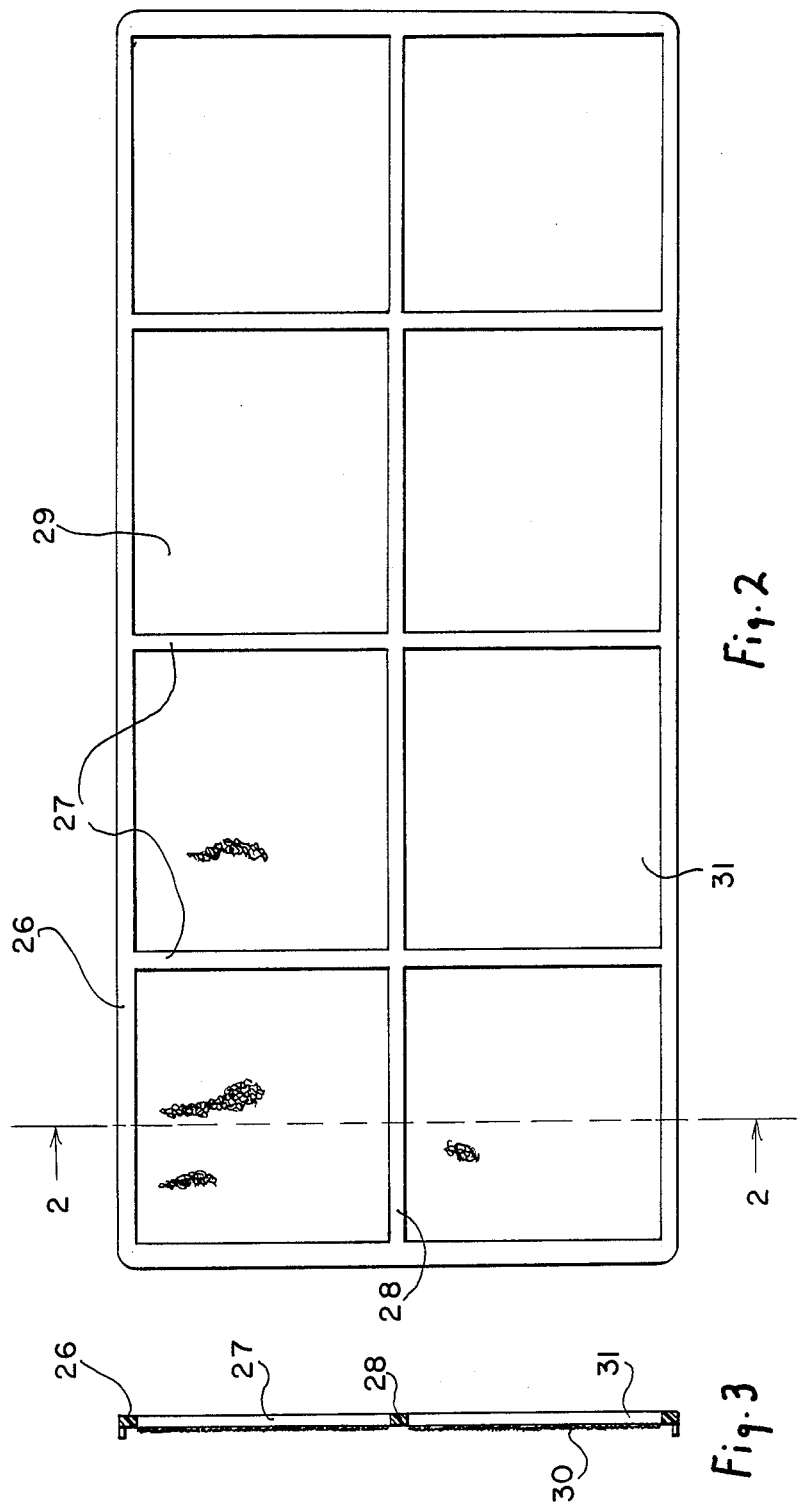

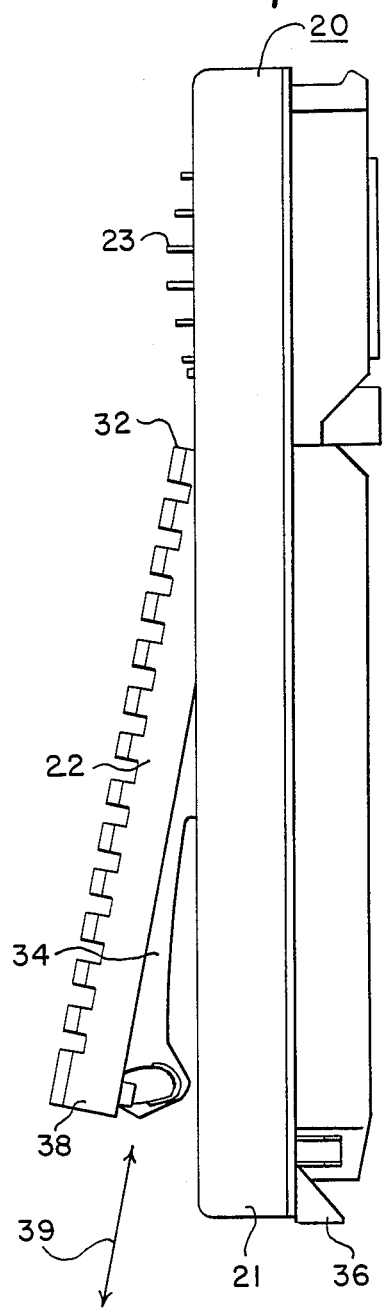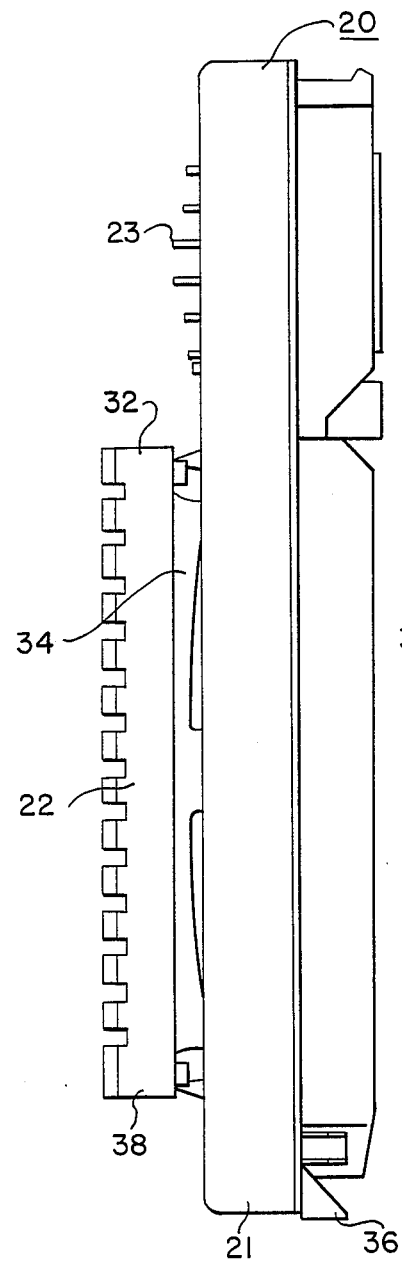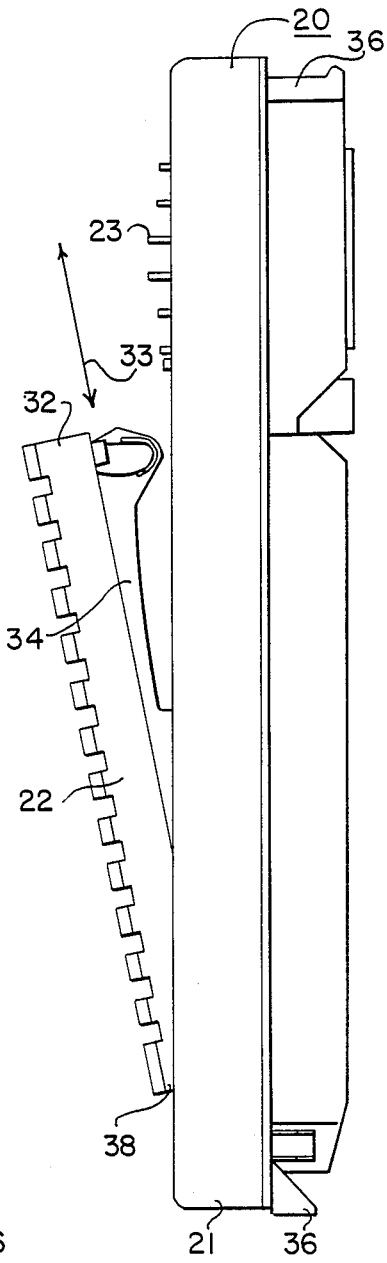

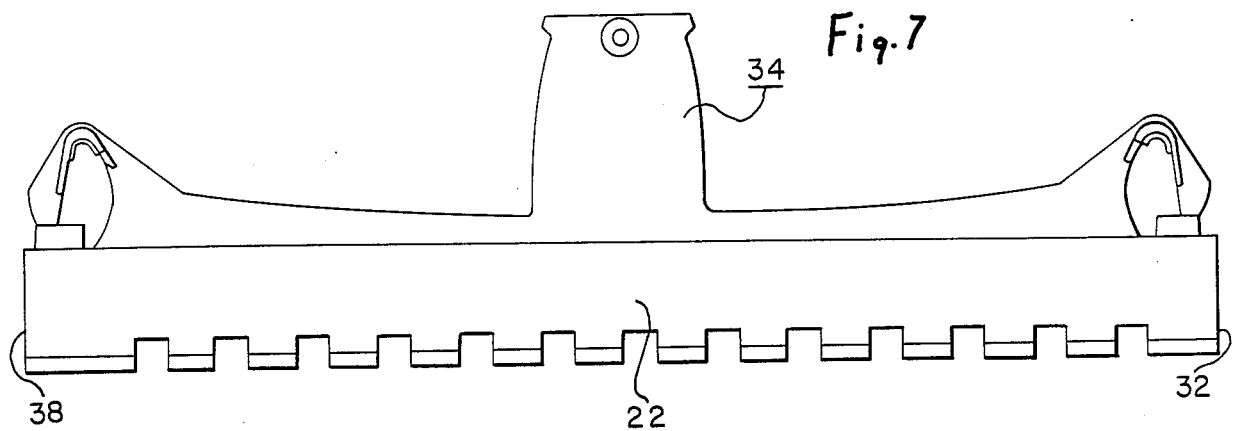
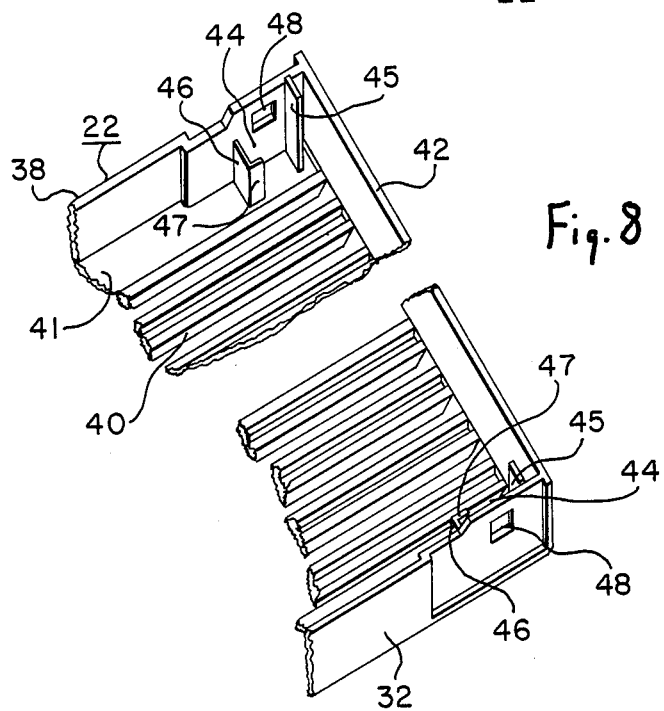
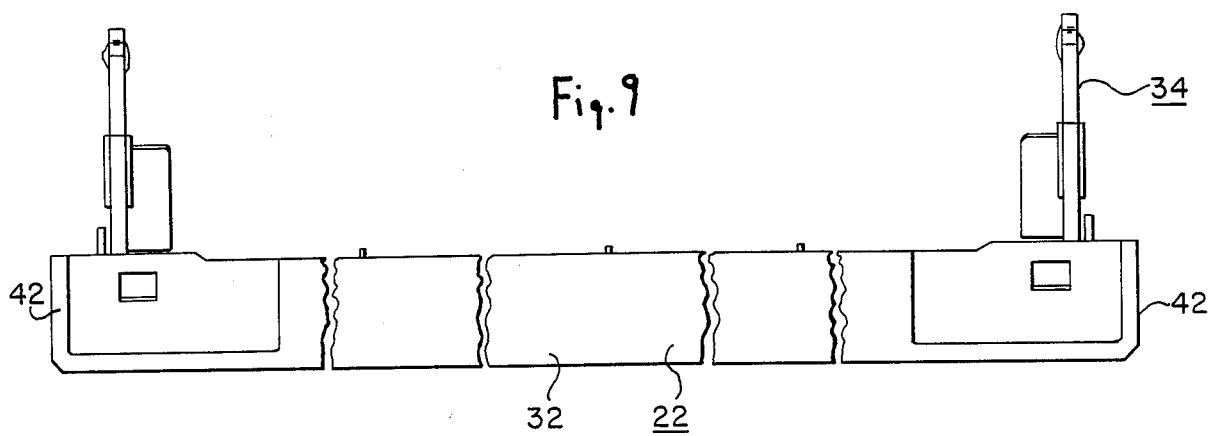

FILTER PANEL ASSEMBLY

This invention relates to filter panel assemblies, and is more in particular directed to an improved panel assembly for an appliance, such as an air conditioner or the like, wherein the panel removably holds a sheet of porous filter material. It is of course apparent that the invention is not limited in scope to panels for air conditioners.

Domestic air conditioners are conventionally provided with front panels incorporating holding arrangements for porous sheet filters, the filters being arranged for example in the path of air directed into the appliance for cooling. In some such panel assemblies, the sheet filter is not mounted in a frame, being held in place in the appliance behind the panel for example on hooks or the like. Such arrangements frequently entail difficulty in replacement of the filter sheet such as, for example, requiring the removal of the entire front panel or a separable portion thereof. Other conventional air conditioning devices are provided with sheet filters mounted in rigid or semi-rigid frames, adapted to be guided through slots or the like in the front panel. A slot in the front panel for receiving the filter must be closed for the filter itself. Arrangements of this type generally enable insertion of the filter in the panel from only one direction, and do not enable the use of filter material other than as mounted in a specific type of filter frame adapted for the particular appliance.

The present invention is therefore directed to the provision of an arrangement for mounting a filter in an air moving appliance, such as an air conditioner, wherein either an unmounted sheet material or a mounted sheet material (i.e. mounted in a frame) may be employed as the filter, and, wherein, when a mounted filter is employed it may be directed into the front panel from alternate directions.

The invention is also directed to the provision of a filter panel assembly that may be fabricated in a simple and economical manner, while having versatile adaptation of mounting of a filter therein.

Briefly stated, in accordance with the invention, these objectives are achieved by the provision of a filter panel mounting assembly comprised of a frame or the like having an aperture for the passage of air therethrough. A substantially rectilinear air permeable panel is mounted to cover the aperture, or a part thereof, the aperture having upper and lower substantially straight edges joined by substantially straight side edges. The panel is provided with guides on the side facing the frame, enabling the guiding of a mounted filter either from the top or bottom of the panel. Releasable latches are provided for holding the corners of the panel to the mounting frame, and projections extending rearwardly from the center of the side edges are slidably guided through slots in the frame. The projections and slots enable limited movement of the panel toward and away from the frame, and also permit relative inclination of the panel with respect to the frame.

As a consequence, either the top or bottom edge of the panel may be pivoted away from the frame, to permit replacement of a filter therein. The projections are releasably held to the frame, thereby enabling the removal of the panel in a simple manner to permit the installation of an unmounted porous filter to the frame, if desired.

In order that the invention may be more clearly understood, it will now be disclosed in greater detail with reference to the accompanying drawings wherein:

FIG. 2 is a front view of a mounted filter for use in the panel of FIG. 1;

FIG. 3 is a cross sectional view of the filter of FIG. 2, taken along the lines 2—2 thereof;

FIG. 4 is a side view of the assembly of FIG. 1 with the top of the panel pivoted away from the frame for replacement of the filter;

FIG. 5 is a side view of the assembly of FIG. 1 with the bottom of the panel hinged away from the frame to permit replacement of the filter from the bottom thereof;

FIG. 6 is a side view of the assembly of FIG. 1 with the panel displaced horizontally with respect to the frame;

FIG. 7 is a side view of the panel for the assembly of FIG. 1;

FIG. 8 is a perspective view of a portion of the rear of the panel, at one edge thereof, showing the mounting arrangements removed therefrom;

FIG. 9 is a top view of a portion of the panel with the mounting arrangements installed;

Figure 1:
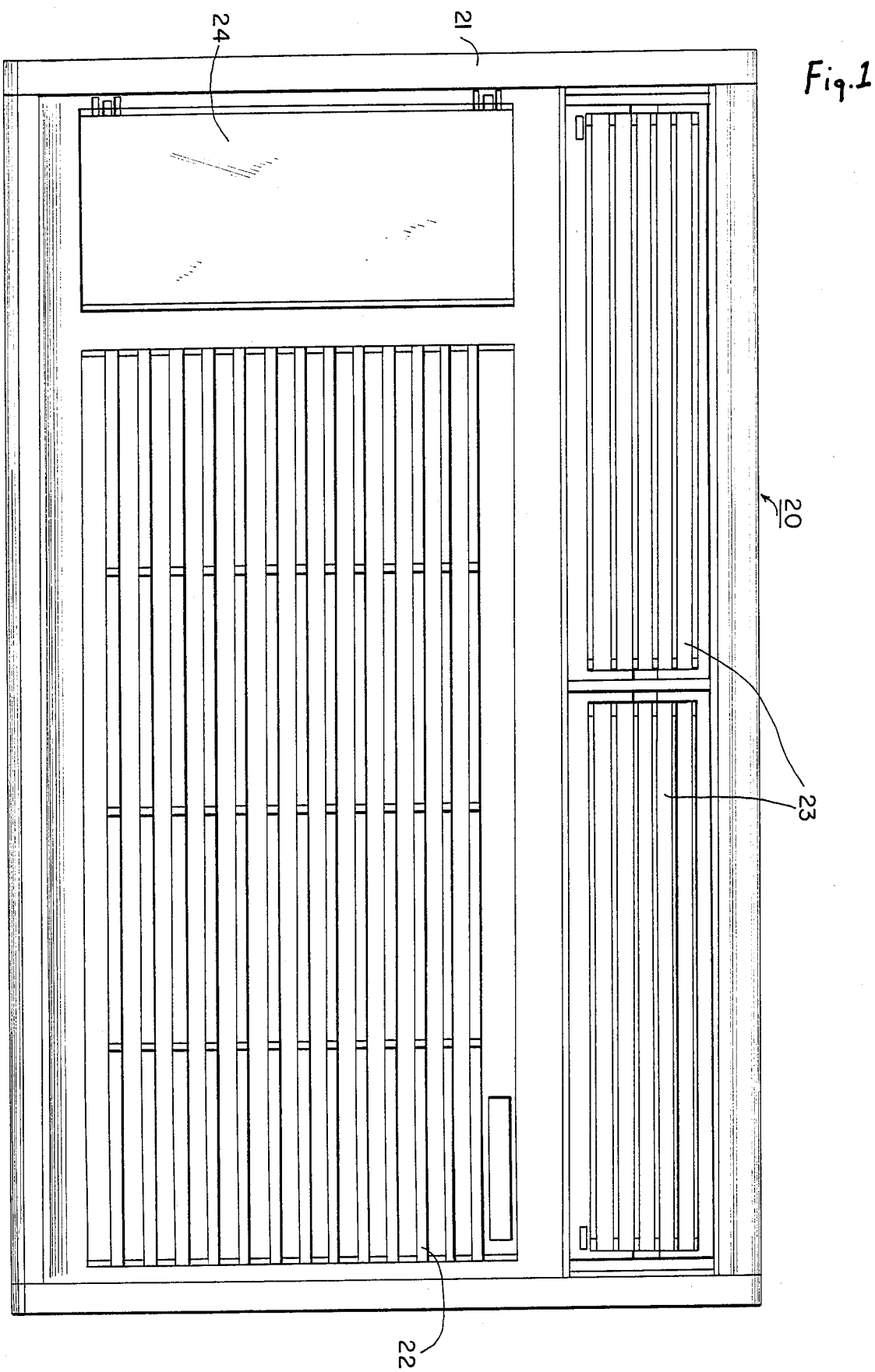
FIG. 1 is a front view of an air conditioner panel in accordance with one embodiment of the invention.

Referring now to the drawings, and more in particular to FIG. 1, therein is illustrated a panel assembly 20 adapted to be employed as the front panel of an air conditioner or the like. The panel is comprised of a frame 21, a panel 22 mounted in the frame and through which air to be cooled enters the air conditioner, a louver assembly 23 mounted to the frame through which cooled air is directed from the air conditioner and a hinged door 24 enabling access to the various controls (not shown) of the air conditioner.

The above described components of the panel assembly may be fabricated, for example, of plastic material, by conventional techniques.

FIGS. 2 and 3 illustrate a filter 31 that may be employed in combination with the panel assembly of FIG. 1. This filter is comprised of an open frame 26 of plastic or other suitable material and having spaced vertical crossed pieces 27 and one or more horizontal cross pieces 28. The frame 26 is generally rectangular, and it and the cross pieces thereby define a plurality of rectangular apertures 29. The apertures are covered by a sheet 30 of porous filter material held by conventional manner to the frame, for example by being pressed into the frame with the application of heat. Filters of this type are conventional, and may be flexible in view of the use of plastic materials for the frame. As will be apparent in the following description, the filter 31 of FIGS. 2 and 3 is adapted to be guided and held at the rear of the panel of the assembly of FIG. 1.

FIG. 4 is a side view of the filter panel assembly of FIG. 1, with the upper edge 32 of the panel 22 hinged away from the frame 20. In this position of the panel 22, the filter (not visible in FIG. 4) may be removed or inserted behind the panel, and guided thereby, in the direction of the double-ended arrow 33. Thus, the filter may be removed or inserted from the top edge of the panel. As illustrated in FIGS. 1 and 4, the panel 22 is louvered. FIG. 4 further illustrates a portion of the mounting 34 for holding the panel, which will be discussed in greater detail in the following paragraphs. The frame 21 may have suitable conventional mounting projections 36, for mounting on the air conditioner. The invention is not concerned with this feature of the panel assembly.

As further illustrated in FIG. 4, the bottom edge 38 of the panel is partially recessed in the frame 21, when it is not hinged out to permit access to the filter, so that the panel does not have an exposed aperture or slot in normal use of the air conditioner. The filter is thus entirely hidden from view.

FIG. 5 shows a view of the panel assembly corresponding to that of FIG. 4, but in which the bottom of the panel 22 has been hinged away from the frame 21, rather than the top thereof as illustrated in FIG. 4. As shown in FIG. 5, the filter (not shown) may be removed from or inserted in the panel in the direction of the arrow 39, i.e. from the bottom of the panel. This feature is, of course, especially advantageous when the air conditioner is mounted at an elevated position in the wall of a room.

FIG. 6 illustrates that the panel 22 may be moved generally horizontally toward or away from the frame 21, to permit, for example, the entire removal of the panel if desired. The structure enabling this feature of the invention will be discussed in greater detail in the following paragraphs.

The construction of the panel 22 and mounting 34 therefor will be more clearly apparent by reference to FIGS. 7–13. FIG. 8 illustrates a portion of the rear of the panel, showing a louvered central portion 40 thereof formed in a frontal plate 41, the upper and lower edges 32, 38 comprising flanges depending therefrom and extending parallel to one another in the rearward direction. Side edges 42 also define flanges extending rearwardly from the edge of the plate 41. An open channel 44 for the mounting is formed at each end of the upper and lower edges 32, 38 comprised generally of a pair of vertical (when the panel is installed in the frame) horizontally spaced apart walls 45, 46 extending inwardly of the panel adjacent the end of the respective edge 32, 38, with a short horizontal wall 47 depending from the free end of the wall 46. An aperture 48 is provided in each of the upper and lower edges 32, 38 between the respective guide walls 45, 46, for the entry of a snap projection as will be discussed. The walls 45–47, along with their respective upper or lower edges 32, 38 thus define the channels 44 for receiving the ends of the mountings 34.

Figure 10:
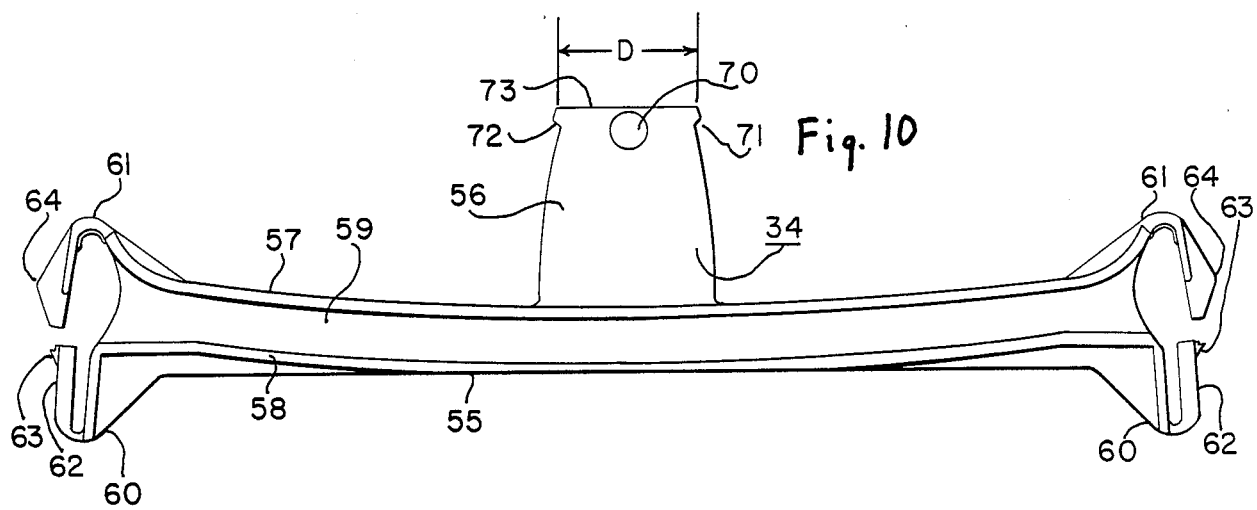
FIG. 10 is one side view of the mounting arrangement for the panel.
Figure 11:
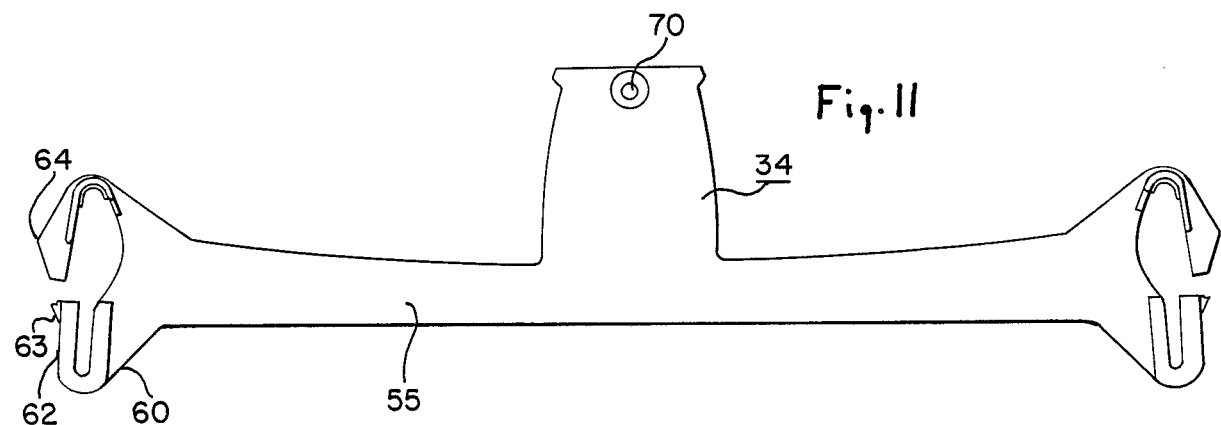
FIG. 11 is the opposite side view of the mounting for the panel.
Figure 12:
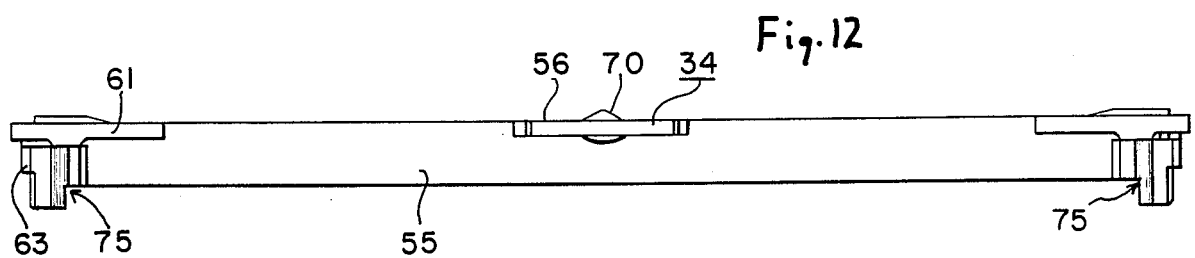
FIG. 12 is a rear view of the mount for the panel.
Figure 13:
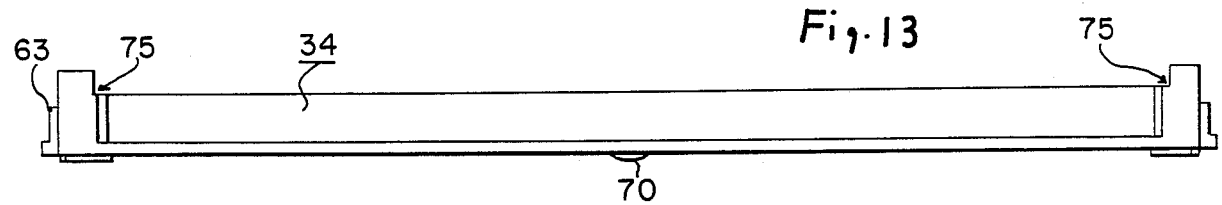
FIG. 13 is a front view of the mount for the panel.
Figure 14:
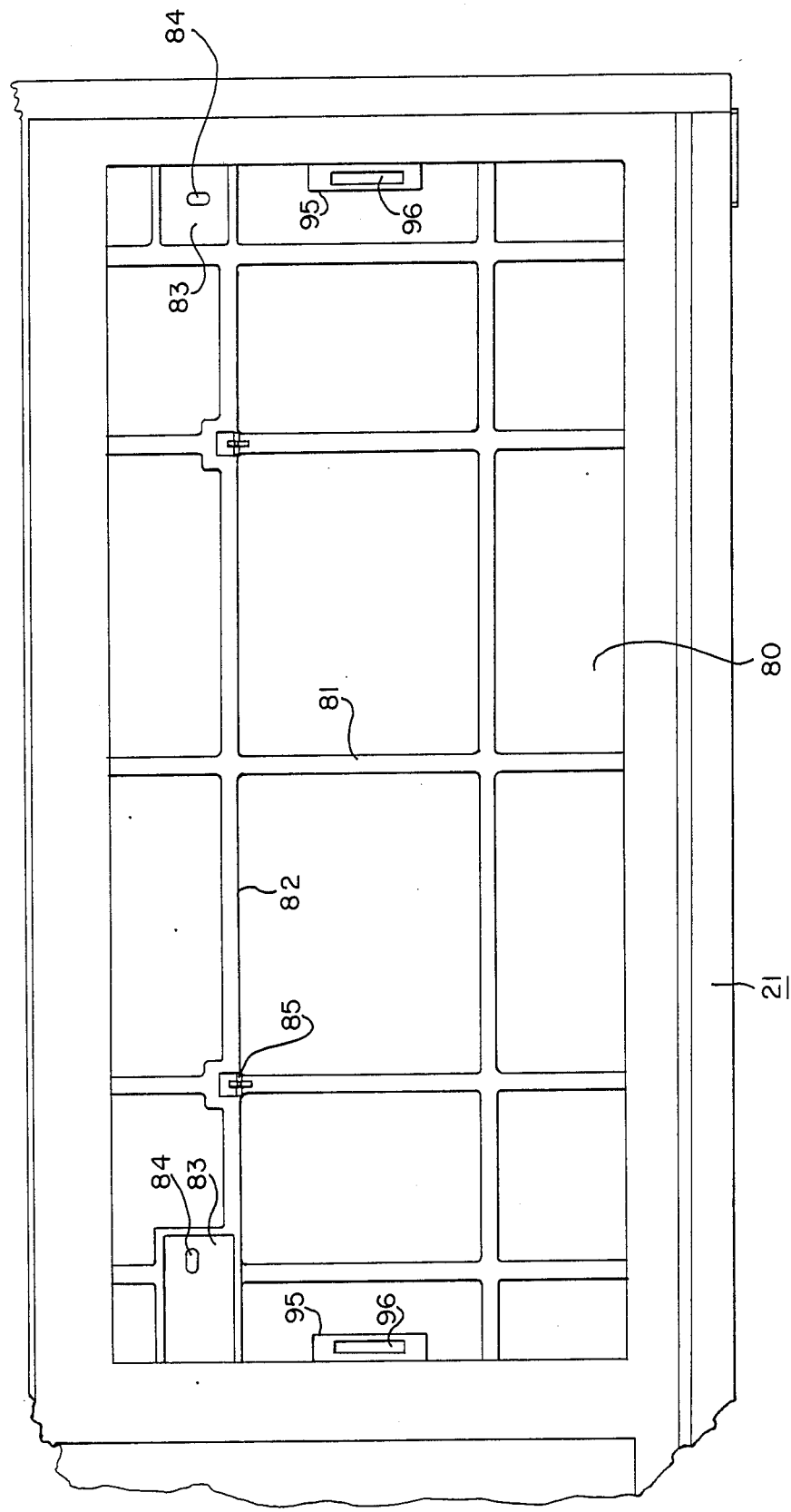
FIG. 14 is a front view of a portion of the assembly of FIG. 1 with the panel thereof removed.

As illustrated in FIGS. 7 and 9–13, the mountings 34 comprise generally T-shaped members with cross arms 55 and pivot arms 56 extending centrally therefrom. As illustrated in FIG. 10, a pair of spaced apart guide walls 57, 58 extend from one side of the cross arm 55, to define a longitudinal channel 59 for slidably guiding and holding the filter 31. The walls 57, 58 are further spaced apart at their ends, in order to simplify the insertion of the filter between the walls. The cross arms 55 are further provided with opposed projections 60, 61 at each end thereof. The projections 60, on the opposite side of the arms 55 as the pivot arms 56, may include extensions of the guide walls 58, and are shaped to be received in the channels 44 of the panels, whereby one projection 60 may be received in each of the vertically aligned channels 44 at a respective end of the panel. The ends 62 of the projections 60 are resilient, for example defining a U-shaped portion, with snap projections 63 on their ends positioned to be received in the apertures 48 of the channels, thereby enabling the releasable holding of the mountings 34 to the rear of the panel.

The projectons 61 have resilient ends 64, for example by the formation of the projections 61 to have generally U-shaped sections, the ends 64 defining snap projections enabling the releasable holding of the panel to the frame 21. The ends 64 defining snap projections are generally slanted on both sides to permit the relatively easy latching and unlatching of these projections from the frame 21, while the projections 63 are slanted on one side to permit ready assembly of the mountings 34 in the panel 22, but are shaped on the other side to enable their removal from the apertures 48 relatively more difficult, for example these projections having edges extending parallel to the mating edges of the apertures 48.

A rounded lug 70 is provided projecting from both sides of the pivot arm 56, this lug being adapted to loosely hold the panel to the frame 21 as will be seen. Accordingly, the pivot arm 56 has a length from the arm 55 to the lug 70 sufficient to enable separation of the panel from the frame to a desired extent. The pivot arm 56 also is provided with detents 71, 72 on opposite edges adjacent the end 73 thereof away from the cross arm 55. These detents 71, 72 serve as stops for the panel 22 when the panel is opened only at the bottom or only at the top, as will be seen.

The mounting 34 as illustrated snap into the panel 22 in FIGS. 7 and 9. In order to economize on the fabrication of the structure, identical mountings 34 may be employed at each end of the panel. In order to insure the proper alignment of the mounting 34 in the panel, the projections 60 may be recessed, as illustrated at reference numeral 75 in FIGS. 12 and 13, the recesses 75 receiving the wall sections 47 when the mountings 34 are properly aligned for assembly.

The portions of the frame 21 cooperating with the panel 22 are illustrated in FIGS. 14–17. The frame 21 has a generally rectangular opening 80 with cross ribs 81, 82 extending vertically and horizontally thereacross respectively. Forwardly open boxes 83 have bottom walls with apertures 84 for receiving screws or the like for mounting of the frame 21 to the appliance, in conventional manner. Hooks 85 may be provided extending forwardly of the ribs 81, 82 for example at several junctions thereof, in order to enable the mounting of a sheet of filter material which has not been mounted in a frame, if desired. The side walls 89 and upper and lower walls 90 of the aperture 80 define the aperture 80 to be slightly smaller than the panel 22, and the ribs 81, 82 are set back from the front of the frame 21 a short distance to enable the rear edges of the panel 22 to abut the front surface 93 of the frame surrounding the aperture 80. As a consequence, the portions of the mounting 34 projecting from the panel 22, as shown in FIG. 7, are fully received in the aperture 80.

Projections 95 extending laterally inwardly from the side walls 89 of the aperture have vertically extending slots 96 for receiving the pivot arms 56 of the mountings. The projections 95 are slightly resilient, in the use of plastic material, so that the lugs 70 can be forced therethrough with a slight amount of pressure, the pressure required to force the lugs through the slots 96 being adequate to restrain the panel from falling out of the frame 1, while permitting its manual removal if desired.

The edges of the pivot arms 56 are dimensioned so that the detents 71, 72 engage the ends of the respective slots 96 when the panel is pivoted open from either the bottom or the top, to limit the pivotal movement of the panel away from the frame 21. The dimension D between the extremities of the sides of the detents is smaller, however, than the length of the slots 96, so that the panel 22 can be removed from the frame 21 in a direction normal to the front of the panel.

Figure 15:
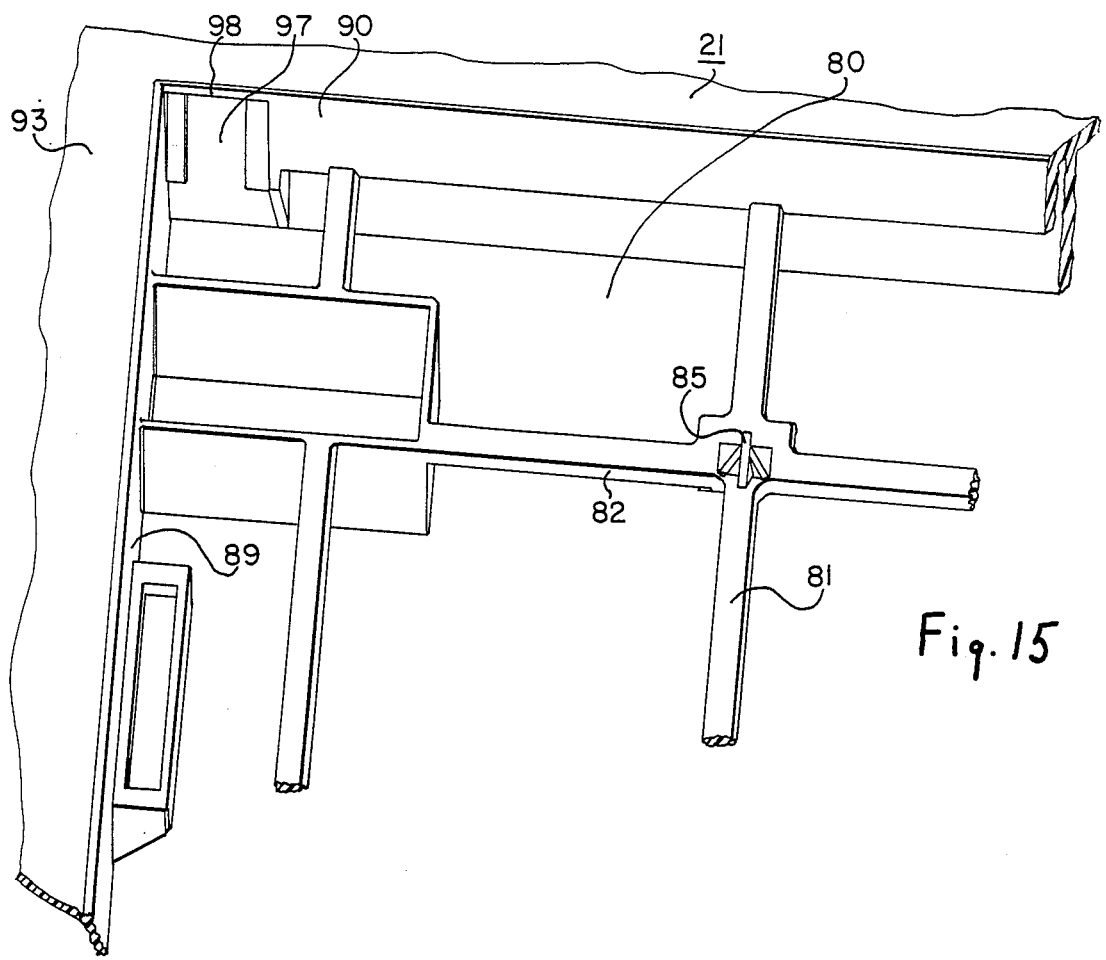
FIG. 15 is an enlarged perspective view of a portion of the frame, illustrating a corner of the air flow aperture thereof.
Figure 16:
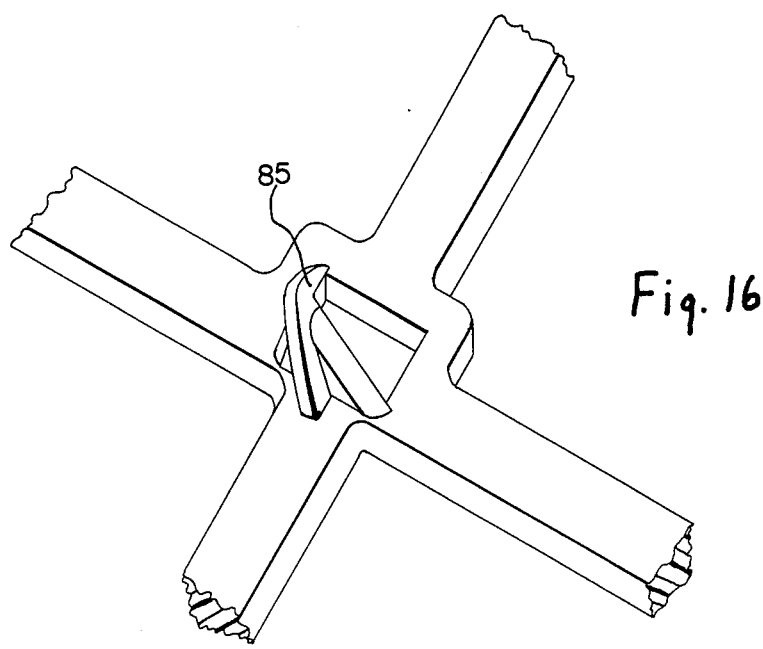
FIG. 16 is an enlarged perspective view of a filter sheet hook of the frame of FIG. 7.
Figure 18:
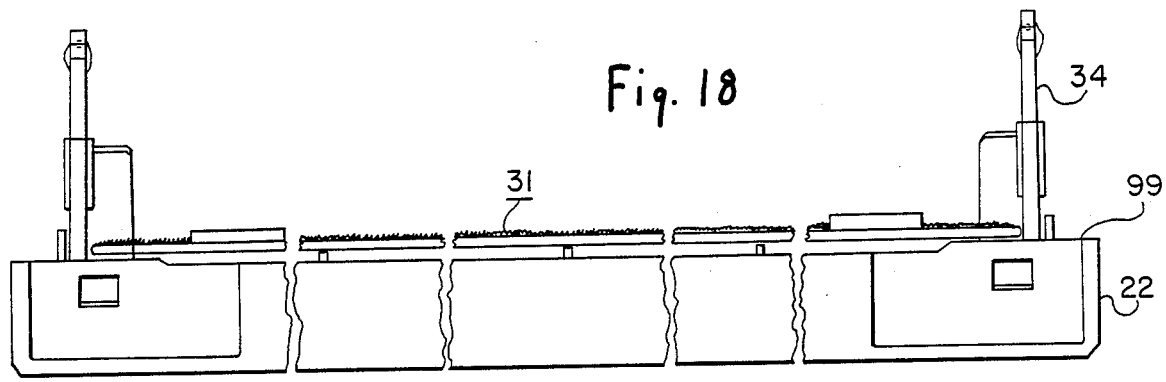
FIG. 18 is a top view of a portion of the panel showing the filter installed therein.
Figure 17:
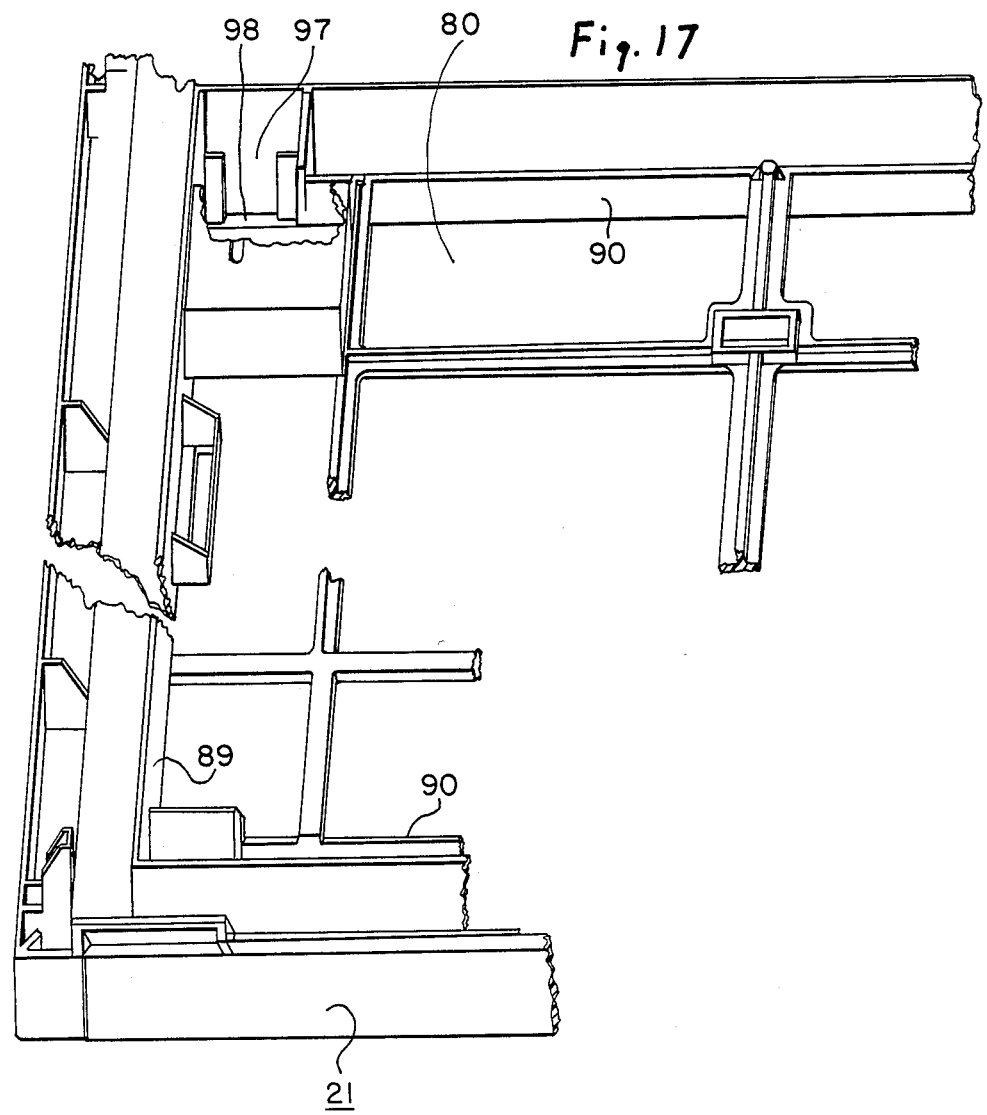
FIG. 17 is a perspective view of a portion of the frame from the rear thereof.

As illustrated more clearly in FIGS. 15 and 17, recesses 97 are provided in the upper and lower walls 90 of the aperture 80, aligned with the projections 61 of the mountings, the recesses 97 defining lips 98 at the front of the frame 21 for engaging the resilient end projection 64 of the mountings, to thereby serve as catches or latches resiliently holding the respective corners of the panel in engagement with the front of the frame 21. FIG. 18 illustrates the panel 22 with the mountings 34 mounted therein, and with a filter 31 inserted to extend between the side walls of the mountings, as such a filter arrangement would be mounted in operation. This FIG. illustrates that, since the rear edge 99 of the panel 22 abuts the front of the frame 21, the filter 31 will normally be hidden from view.

While the invention has been disclosed and described with reference to a single embodiment, it is apparent that variations and modifications may be made therein, and it is therefore intended in the following claims to cover each such variation and modification as falls within the true spirit and scope of the invention.

What is claimed is:

1. A filter panel assembly comprising a frame having an aperture extending therethrough, a substantially rectilinear air permeable panel having a front, a back, first and second parallel edges, and third and fourth parallel edges interconnecting said first and second edges, means for mounting said panel to said frame to substantially cover said aperture, said mounting means comprising a first catch arrangement means for releasably holding said first edge of said panel against said frame, projection means extending in a direction from said third edge of said panel toward said frame, and guide means in said frame receiving and guiding said projection means while permitting limited movement of said panel away from said frame and limited angular displacement of said panel with respect to said frame, said projection means being releasable from said guide means, and means for releasably holding said filter to the back of said panel, said back of said panel facing said frame, said first catch arrangement permitting pivotal movement of said panel with respect to said frame, whereby said panel may be pivoted toward and away from said frame with said first catch arrangement as a pivot axis.

2. The filter panel assembly of claim 1 wherein said first catch arrangement comprises a first panel catch on said panel releasably engageable with a complementary first frame catch on said frame, 3. The filter panel assembly of claim 1 further comprising a second catch arrangement pivotally and releasably holding said second edge of said panel against said frame, whereby said panel may be pivoted toward and away from said frame with said second catch arrangement as a pivot axis.

4. The filter panel assembly of claim 3 wherein said first and second catch arrangements comprise first and second panel catches respectively on said panel releasably engageable with complementary first and second frame catches respectively on said frame.

5. The filter panel assembly of claim 3 wherein said mounting means comprises a mounting element releasably held to said panel adjacent said third edge thereof, said mounting element comprising a unitary element with said first and second panel catches and said projection means being formed thereon.

6. A filter panel assembly comprising a mounting frame having an aperture, an air permeable panel having front and back sides and first and second parallel spaced apart edges, an air filter releasably mounted to the back side of said panel, said back side being toward said frame, and mounting means for pivotally releasably mounting said panel to said frame to cover said aperture, said mounting means comprising first releasable interconnection means between the panel and frame for permitting limited movement of the panel toward and away from the frame independently of the relative angular orientation therebetween, and permitting limited angular displacement of the panel about an axis parallel to said first and second edges, said mounting means further comprising first and second releasable catch means for selectively holding said first and second edges respectively to said frame while permitting angular displacement of said panel with respect to said frame about axes parallel to said first and second edges.

7. The filter panel assembly of claim 6 wherein said mounting means comprises a first mounting element releasably held to said panel, said first interconnection means comprising a projection extending from said mounting element and a guide on said frame for receiving and guiding said projection.

8. The filter panel assembly of claim 6 wherein said mounting means comprises a first mounting element releasably held to said panel, said first and second catch means comprising first and second panel catch elements on said mounting element and first and second frame catch elements mounted on said frame and cooperatively coupled to said first and second panel catch elements.

9. The filter panel assembly of claim 8 wherein said first interconnection means comprises a projection extending from said first mounting element, and a guide in said frame for holding and guiding said projection.

10. The filter panel assembly of claim 6 wherein said mounting means comprises first and second elongated mounting elements releasably held to said panel in spaced apart parallel relationship, to extend substantially perpendicular to said first and second edges, said first interconnection means comprising a projection projecting from each of said mounting elements and guided by a respective guide in said frame, said first and second catch means each comprising a panel catch element on each of said mounting elements and a separate frame catch element on said frame positioned to engage each of said panel catch elements.

11. The assembly of claim 10 wherein said first and second mounting elements are identical in shape and are snap fit to said panel.

12. A panel assembly for directing the flow of air, comprising a mounting frame having an aperture, an air permeable panel, and means for mounting said panel to said frame to cover said aperture, said mounting means comprising first and second catch arrangements for releasably holding said panel to said frame for selective pivotal movement about first and second parallel spaced apart axes, respectively, whereby either of two opposite edges of said panel may be pivoted away from said frame, and projection means mounted to said panel and guided in guide means on said frame for holding said panel to said frame while guiding said panel for pivotal movement about said first and second parallel axes.

13. The panel assembly of claim 12 wherein said panel is a substantially rectilinear louvred panel.

14. The panel assembly of claim 12 wherein said projection means are releasably held to said guide means.

15. The panel assembly of claim 12 further comprising a substantially flat filter, and further comprising a mounting arrangement on the side of said panel toward said frame for slidably receiving and holding said filter, whereby said filter may be inserted in and removed from said panel at either of said two opposite edges of said panel.

16. The panel assembly of claim 12 wherein said mounting means comprises first and second elongated mounting elements snap fit to said panel in spaced apart positions and extending substantially perpendicular to said two opposite edges, said first and second catch arrangements each comprising a catch element on each of said first and second mounting elements.

17. The panel assembly of claim 16 wherein said projection means comprise first and second projections extending from said first and second mounting elements, respectively.

18. The panel assembly of claim 17 wherein said guide means comprise guide channels in said frame for receiving said projections.

* * * * *